United States Patent [19]

Roberts et al.

[11] Patent Number: 6,033,703
[45] Date of Patent: Mar. 7, 2000

[54] BETA-STABLE LOW-SATURATE, LOW TRANS, ALL PURPOSE SHORTENING

[75] Inventors: Bruce Alan Roberts, Cincinnati; Timothy Alan Scavone, Maineville; Steven Philip Riedell, Fairfield, all of Ohio

[73] Assignee: The Procter & Gamble Company, Cincinnati, Ohio

[21] Appl. No.: 08/082,177

[22] Filed: Jun. 24, 1993

[51] Int. Cl.[7] ..................................... A23D 9/00
[52] U.S. Cl. ...................... 426/312; 426/319; 426/474; 426/606
[58] Field of Search .................. 426/606, 474, 426/319, 312, 608, 610, 607

[56] References Cited

U.S. PATENT DOCUMENTS

| | | | |
|---|---|---|---|
| Re. 33,996 | 7/1992 | Jandacek | 514/23 |
| 1,389,947 | 9/1921 | Hechler . | |
| 2,174,365 | 9/1939 | Gudhum | 426/607 |
| 2,521,219 | 9/1950 | Holman et al. | 99/118 |
| 2,521,242 | 9/1950 | Mitchell | 99/118 |
| 2,521,243 | 9/1950 | Mitchell | 99/128 |
| 2,909,432 | 10/1959 | Linteris | 99/118 |
| 3,253,928 | 5/1966 | Bedenk et al. | 99/139 |
| 3,360,376 | 12/1967 | Dobson | 99/118 |
| 3,397,997 | 8/1968 | Japikse | 99/118 |
| 3,425,842 | 2/1969 | Japikse | 99/122 |
| 3,425,843 | 2/1969 | Japikse | 99/144 |
| 3,597,230 | 8/1971 | Colby et al. | 99/122 |
| 3,600,186 | 8/1971 | Mattson et al. | 99/1 |
| 3,637,402 | 1/1972 | Reid | 426/474 |
| 3,706,578 | 12/1972 | Bence | 99/118 R |
| 3,857,985 | 12/1974 | Reid et al. | 426/362 |
| 4,341,812 | 7/1982 | Ward | 426/603 |
| 4,341,813 | 7/1982 | Ward | 426/603 |
| 4,919,964 | 4/1990 | Adams | 426/606 |
| 4,996,074 | 2/1991 | Seiden et al. | 426/601 |
| 5,064,670 | 11/1991 | Hirshorn et al. | 426/607 |
| 5,104,678 | 4/1992 | Yang | 426/601 |
| 5,194,281 | 3/1993 | Johnston et al. | 426/531 |
| 5,215,779 | 6/1993 | Dake et al. | 426/601 |

FOREIGN PATENT DOCUMENTS 2208079  2/1989  United Kingdom ................... 426/606

OTHER PUBLICATIONS

Gunstone 1983 Lipids in Foods Chemistry Biochemistry and Technology Pergamon Press p. 149–150.

Coppen, P.P., "The Use of Antioxidants", *Rancidity in Foods*, Applied Science Publishers, J. C. Allen and R. J. Hamilton, eds., (1990), Chapter 5, pp. 67–69.

Gordon, M.H., "The Mechanism of Antioxidant Action in vitro", *Food Antioxidants*, Elsevier Applied Science, publisher, B.J.F. Hudson, ed., (1983), pp. 4–19, 105.

*Primary Examiner*—Carolyn Paden
*Attorney, Agent, or Firm*—Rose Ann Dabek; Karen F. Clark; Jacobus C. Rasser

[57] ABSTRACT

A beta stable plastic shortening exhibiting reduced levels of saturates and trans fatty acids and a unique process is disclosed. The shortening is particularly useful in confectionary, baking, and frying applications. The plastic shortening of the present invention contains from about 6% to about 25% by volume, of an inert gas and from about 75% to about 94% by volume of a fat made of a) from about 74% to about 90% by weight of a base oil having less than 10% by weight of trans fatty acids, b) from about 10% to about 20% by weight of a hardstock blend, having a beta stable crystalline phase consisting essentially of i) from about 20% to about 80% by weight, of a beta phase tending hardstock component having an iodine value of less than 10, and ii) from about 20% to about 80% by weight, of a beta prime phase tending hardstock component having an iodine value of less than about 10. If desired, the plastic shortening may also contain from about 25 ppm to about 500 ppm added antioxidant and/or from about 1% to about 8% of an emulsifier. From about 0.05% to about 3% additional ingredients may also be added to the plastic shortening. The plastic shortening of the present invention has a finished shortening penetration of from about 160 mm\10 to about 275 mm/10 and a maximum gas bubble size of less than 1 mm.

18 Claims, No Drawings

BETA-STABLE LOW-SATURATE, LOW TRANS, ALL PURPOSE SHORTENING

BACKGROUND OF THE INVENTION

Plastic shortenings are generally produced by appropriate thermal and mechanical treatment of a mixture of several components. In the production of a conventional plastic shortening, lightly hydrogenated vegetable oils and intermediate hardened oils are blended with fully hydrogenated hardstock in varying proportions to produce a product which is approximately 85% oil and 15% solid at room temperature. The quality and texture of shortenings depend on incorporated gas, plasticity and consistency and solid to liquid ratio. These physical characteristics are determined by the crystal phase of the fats used and the method of preparation.

Although the beta phase crystalline form of triglyceride is a more thermodynamically stable crystalline phase than the beta prime phase, plastic shortenings having a solid phase predominantly in the beta prime form are usually used because the beta phase crystalline form shortenings have historically tended to have a soupy, highly fluid consistency and/or a translucent appearance. Lard and tallow are predominantly in the beta phase, but contain high levels of saturated fat. It is well known in the art that beta prime crystals, if present, have the capacity to form a rigidly interlocking structure when suspended in a liquid component at sufficient concentration. However, plastic shortenings containing beta prime solid triglycerides are noticeably deficient in their ability to withstand storage at temperatures ranging from 90–100° F. for periods of 1–3 months or so without appreciable change in their performance and appearance. Some types of beta prime plastic shortenings tend to stiffen or firm excessively and thus become difficult to blend with other constituents in normal food recipes. Shortening blends of vegetable oils and fat derived from animals are also beta prime phase plastic shortenings. However, these shortenings are also high in saturates and tend to be firm. Because both the beta phase plastic shortening and the beta prime plastic shortening lack desired features, a compromise often has been made in preparing conventional plastic shortenings. Generally shortenings crystallized in the beta prime phase are thought to be preferable for providing the most uniform product appearance and stability over varying temperature ranges.

Conventional plastic shortenings comprise intermediate-melting, partially hydrogenated semi-solid fat commonly called "intermediate-melting fat" dispersed in the liquid oil, an unhardened or partially hydrogenated liquid oil commonly called "base oil", and a fully hydrogenated solid fat commonly called "hardstock". In general, the method of attaining the beta prime crystal form desired for plastic shortenings is to use a suitable beta prime tending highly hydrogenated or saturated hardstock. Conventional beta prime tending hardstocks contain triglycerides that may undergo polymorphic transformations and crystal size changes on processing and storage and/or on temperature variations under stress conditions. This transformation results in a shortening which has a poor appearance, poor volume and poor performance. Further, the hydrogenation process causes transisomeric forms of the mono and poly-unsaturates to form. There is some concern that trans isomers and saturated fats in the diet may be linked to high levels of cholesterol in the blood (hypercholesterolemia).

The use of vegetable oils and margarine for cooking and baking are thought to be an effective means for lowering dietary intake of saturated fats and trans fatty acids. A typical vegetable oil has about 2.0 grams of saturates and 0 grams of trans per serving. Conventional margarine contains about 2.0 grams of saturated fat and 2.5 grams of trans fatty acids per serving as compared to vegetable plastic shortenings which typically contain from about 2.5 to about 3.5 grams of saturated fat and from about 2.0 to about 2.5 grams of trans fatty acids per serving. While vegetable oils and margarines are desirable from a health aspect, vegetable oil is often less desirable for baking due to lack of performance e.g. "poor creamability". Margarines are less desirable for frying. In pan frying, margarines brown and burn, and in deep frying they are totally unusable, due to the reaction of the protein and sugars required by the margarine standard of identity.

Low trans isomer fat products (e.g., certain margarines and shortenings) are generally formed from a blend of interesterified fats, unsaturated vegetable oils, saturated vegetable oils and mixtures thereof. While these processes produce a low trans fat product, the product is often high in saturated fats. Other methods focus on reducing the saturated level fats by utilizing the trans-isomer content of the unsaturated fatty acids to provide functional solids for the shortening or margarine. A way of producing a lower saturate, lower trans shortening would be to utilize genetically bred oil with low saturates level and no trans isomers. However these oils tend to be very expensive, and availability of the oils is limited.

It has surprisingly been found that by using an unhydrogenated base oil low in saturates and low in trans, a mixture of a beta tending hardstock and a beta prime tending hardstock both having an IV of less than 10, an antioxidant, an emulsifier and an inert gas, in combination with a unique processing method that an effective baking and frying shortening can be made. This unique shortening has reduced levels of saturates and trans fatty acids. This is accomplished predominantly by reducing the level of trans fatty acids and saturates in the base oil by using an unhydrogenated base oil and an antioxidant, which provides oxidative stability, a highly efficient structuring system and high levels of inert gas dispersed in the shortening. The antioxidant controls undesirable oxidation of unhydrogenated oils. The beta prime tending hardstock is responsible for obtaining the desired beta prime like behavior even though the shortening is in the beta phase. The beta tending hardstock stabilizes the shortening in the beta phase without destroying the desired beta prime like performance, thereby achieving the desired stability and performance of a plastic shortening. Accordingly, the low saturate, low trans stable plastic shortening of the present invention has from about 1.5 grams to about 2.5 grams of saturates, and about 0 grams to about 0.5 grams trans fatty acid isomers per serving as compared to conventional shortening which contain about 2.5 grams to about 3.5 grams of saturates, and about 1.5 to about 2.5 grams of trans fatty acid isomers per serving.

It is therefore an object of the present invention to provide a low saturate, low trans, beta stable plastic shortening suitable for use in preparation of a broad range of applications consisting of, but not limited to shortenings, peanut butter stabilizers, cosmetics, confections, frostings and baked goods and margarine.

It is also the object of the present invention to provide a beta stable plastic shortening exhibiting superior product appearance, texture, and stability, and to provide a method for its preparation.

It is also the object of the present invention to provide a beta stable plastic shortening having a uniform consistency and which does not have a tendency to firm over a wide range of temperatures. It is stable to temperature cycling.

Another object of this invention is to provide a method of preparation of a low saturate, low trans, plastic shortening having the above described characteristics.

These and other objects will become apparent from the following detailed description. All percentages herein are by weight unless otherwise specified.

SUMMARY OF THE INVENTION

The present invention is directed to a plastic shortening which has a reduced level of saturates and trans fatty acid isomers. Said low-saturate, low trans plastic shortening comprises:
(1) An inert gas;
(2) a fat phase comprising:
   a) an edible oil, most preferably unhydrogenated;
   b) a hardstock blend; said hardstock blend consisting essentially of:
      i) a beta phase tending hardstock; and
      ii) a beta prime phase tending hardstock.
(3) optionally an antioxidant; and
(4) an emulsifer, if desired.

Accordingly, the plastic shortening comprises:
(1) from about 6% to about 25%, preferably from about 12% to about 23%, most preferably from about 15% to about 20% by volume of an inert gas;
(2) said fat phase consists essentially of:
   a) from about 74% to about 90%, preferably from about 80% to about 90% of an edible oil; said edible oil having from 0% to about 10%, most preferably from 0% to about 8% trans fatty acid isomers, and less than 10% saturated fatty acids, preferably less than 8% saturated fatty acids and preferably at least 0.01% naturally occurring tocopherol;
   b) from about 10% to about 20%, preferably from about 11% to about 16% hardstock blend; said hardstock blend consist essentially of:
      i) from about 20% to about 80%, preferably from about 25% to about 65%, and most preferably from about 30% to about 50% beta tending hardstock having an iodine value (hereinafter IV) of no more than about 10; preferably no more than about 8;
      ii) from about 20% to about 80%, preferably from about 35% to about 75%, most preferably from about 50% to about 70% beta prime tending hardstock having an IV of no more than about 10; preferably no more than about 8; and optionally,
(3) from about 25 to about 500 parts per million (hereinafter "ppm") antioxidant, preferably at least about 50 ppm but no more than about 300 ppm;
(4) from about 1% to about 8%, preferably from about 1% to about 6% of an emulsifier having from about 25% to about 95%, preferably from about 30% to about 95% monoglyceride.

A process for making a low saturate, low trans beta stable plastic shortening comprising the steps of:
(1) Fully melting and mixing said base oil, hardstock mixture, antioxidant and emulsifier at a temperature of from about 120° F. to about 180° F.;
(2) injecting from about 6% to about 25%, preferably from about 15 to about 20% by volume of an inert gas under a pressure of from about 50 to about 700 pounds per square inch gauge (hereinafter "psig") to form a shortening mixture;

(3) rapidly cooling said shortening mixture in a scraped surface heat exchanger to a temperature of from about 40° F. (4° C.) to about 70° F. (21° C.);
(4) agitating said shortening mixture in a picker box sufficiently long enough to transform said shortening mixture to at least 50% beta crystals upon filling, and imparting enough work input such that said shortening mixture has a finished shortening consistency of from about 160 mm/10 to about 270 mm/10 and a maximum inert gas bubble size of less than 1 mm;
(5) heating said shortening mixture in a scraped surface heat exchanger and placing into a suitable container; said shortening mixture having a filling temperature of from about 70° F. (21° C.) to about 92° F. (33° C.), preferably from about 75° F. (24° C.) to about 80° F. (27° C.);
(6) tempering said shortening at a temperature of from about 80° F. (27° C.) to about 110° F. (43° C.), preferably from at least about 80° F. (27° C.) to about 90° F. (32° C.) for at least about 24 hours;

DETAILED DESCRIPTION

The present invention relates to a beta stable plastic shortening. The term "plastic" as used herein is utilized to designate a shortening product which appears to be solid at room temperature.

The term "fat" as used herein is intended to include all edible, fatty acid triglycerides regardless of origin or whether they are solid or liquid at room temperature. Thus, the term "fat" includes normally liquid and normally solid vegetable and animal fats and oils. The term "oil" as employed herein, is intended to refer to those fats which are liquid in their unmodified state. Natural and synthetic fats and oils are included in these terms.

The term "beta prime phase tending" or "beta prime-tending" as used herein defines an overall tendency of certain triglyceride solids to crystallize and remain stable for the most part, in beta prime phase. This does not mean, however, that under proper conditions, triglyceride solids cannot be transformed from beta prime phase to beta phase. The types of polymorphic crystalline structures of fats can be identified by their X-ray diffraction patterns and are described in U.S. Pat. No. 2,521,241 and 2,521,242 granted to Paul J. Mitchell, Jr., Sep. 5, 1950.

The term "edible oil" or "base oil" as used herein refers to an oil which is substantially liquid at room temperature and has an IV of greater than 70, more preferably greater than 90. The base oil can be unhydrogenated oil or partially hydrogenated oil, modified oil or mixtures thereof.

The term "fully- or substantially hydrogenated" or "hardened hardstock" as used herein relates to solid fats which have an IV less than 12 preferably less than 10 most preferably about 2 or less.

The term "fatty acid" as used herein refers to the fatty acid portion of the respective glyceride.

The term "saturates", "saturated fat", and "saturated fatty acids" as used herein refer to $C_4$ to $C_{26}$ fatty acids or esters containing no unsaturation unless otherwise indicated.

The term "trans", "trans fatty acids", "trans isomers" and "trans isomers of fatty acids" as used herein refer to fatty acids and/or esters containing double bonds in the trans configuration usually resulting from hydrogenation or partial hydrogenation of a fat. A method suitable for measuring the trans isomers of the present invention and the components therein is described by Madison, et al. in "Accurate Determination of Trans Isomers in Shortening and Oils by Infrared Spectrophotometry", in J. Amer. Oil Chem. Soc., Vol. 59, No. 4 (April, 1982), pp. 178–81, (herein incorporated by reference).

The term "iodine value" or "IV" as used herein refers to the number of grams of iodine equivalent to halogen adsorbed by a 100 gram sample of fat. This is a measure of the unsaturated linkages in a fat. The IV or a fat or oil can be determined by the AOCS Official Method Col. 1–25, also known as the Wijs method.

The term "serving size" as used herein refers to FDA regulation 21 CFR 101.9(b) and 21 CFR 101.12 (herein incorporated by reference).

The present invention relates to a low-saturate, low-trans beta stable plastic shortening which comprises: less than about 5 gm, preferably less than about 3 gm saturated fatty acids per serving; and from about 0 gm to about 1 gm, preferably less than 0.5 gm trans isomer content per serving.

THE COMPONENTS

Inert Gas

The desired product appearance, overall consistency and performance of a plastic shortening is partially due to the bubble size of the inert gas dispersed in the shortening and partially due to the total amount of inert gas present in the shortening formula. A wide range of shortening consistencies and appearances are possible. However, incorporating large volumes of inert gas may cause the plastic shortening to have a poor structure and a swiss cheese appearance. The cheesy appearance is caused primarily by the coalescence of gas bubbles, which create "voids" or "pockets" of gas in the plastic shortening. The present invention utilizes an inert gas to control product consistency and to reduce the amount of saturates and trans fatty acids present in the total volume of the plastic shortening. It is preferable to incorporate nitrogen into the plastic shortening in proportions such that the shortening composition comprises, from about 6% to about 25%, preferably from about 12% to about 23%, most preferably from about 15% to about 20% by volume. Vegetable shortenings typically contain from 10–12% nitrogen by volume and may be firm or soft and creamy in their blendability characteristics. Plastic shortenings made from meat fats may contain up to 22% nitrogen by volume, however, they are very firm and difficult to blend. Surprisingly, we found that by controlling the freezing and crystallizing process, we could produce a vegetable shortening with an inert gas level as high as 23% that performs as well as shortenings with lower inert gas levels. It is also soft and easy to blend and has a smooth, creamy appearance with no swiss cheese appearance.

Base Oil

The plastic shortening of the present invention contains from about 74% to about 90%, preferably from about 80% to about 90% of an edible oil (hereinafter referred to as "base oil"). The base oil to be utilized in the plastic shortening of the present invention is an oil which has an IV of above 70 preferably more than 90, and most preferably from about 90 to about 120. The base oil is substantially liquid at room temperature. In addition, said base oil is an unhydrogenated or partially hydrogenated fat which has no more than about 10% $C_4$–$C_{26}$ saturated fatty acids and has no more than about 10% trans fatty acids.

To achieve a base oil exhibiting the above-specified characteristics, it is preferable to use refined and bleached canola oil having less than 2% trans isomers of fatty acids. Trans isomers in the base oil are not desirable since they contribute to total trans level in the plastic shortening.

Refined and bleached canola oil is particularly suitable because it has the desired low level of saturated fatty acids, and requires no hydrogenation. It has a low level of trans-isomers of unsaturated fatty acids because there is no need to hydrogenate it. It is believed that the unsaturated, low trans base oil helps to stabilize the hardstock components in the beta phase. Although refined and bleached canola oil is preferably used to make a base oil suitable for use in the low saturate, low trans isomer plastic shortening of the present invention, the source of oils and/or method used to make the base oil are not important, so long as the base oil is an unhydrogenated or partially hydrogenated oil which has no more than about 10% saturated fatty acids; and preferably no more than about 2% trans isomers of unsaturated fatty acids. Of course, genetically bred, bioengineered or microbial source oils having the requisite characteristics would be suitable.

Other oils suitable for the purpose of this invention can be derived, for example from the naturally occurring liquid oils such as sunflower oil, soybean oil, olive oil, corn oil, peanut oil, safflower oil, high oleic sunflower oil, low linoleic, canola oil, high oleic safflower oil, glycerol esters of purified fatty acid methyl esters, polyglycerol esters as long as saturates and trans isomers level are within the preferred range and mixtures thereof. Also, suitable liquid oil fractions can be obtained from palm oil, lard, and tallow, for example, as by fractionation or by direct interesterification, followed by separation of the oil.

The Hardstock Blend

The plastic shortening of the present invention also comprise from about 10% to about 20%, preferably from about 11% to about 16% of a hardstock blend. Said hardstock blend is solid at room temperature and is a triglyceride of saturated fatty acids. The hardstock provides high temperature stability to the low saturate, low trans shortening. The hardstock blend comprises two components: i) from about 20% to about 80%, preferably from about 30% to about 50% beta tending hardstock; and ii) from about 20% to about 80%, preferably from about 50% to about 70% of a beta prime tending hardstock.

Surprisingly, it has been found that when a beta tending hardstock and a beta prime tending hardstock are used in specified percentages as set forth herein, the resulting plastic shortening is stable in the beta phase. Thus, the hardstock compositions of the invention co-act in a beneficial manner to provide improved beta phase stability. As previously mentioned, plastic shortenings crystallized in the beta phase tend to have a highly fluid consistency and translucent appearance. However, employing the previously described percentages of the beta tending hardstock and beta prime tending hardstock components provides a beta phase shortening which surprisingly is uniform in consistency, opaque in appearance, capable of holding high levels of inert gas, and does not firm up after exposure to slightly elevated temperatures.

Hardstock component (i) is a beta tending hardstock having an IV of less than about 10, most preferably has an IV within the range of 0–6. A highly preferred IV value for hardstock (i) is about 2. Preferably, the beta tending hardstock is a fully hydrogenated triglyceride comprising about 85% to about 100% $C_{16}$–$C_{22}$ fatty acids. Suitable hardstock having strong beta phase tendencies can be derived from substantially completely hydrogenated fats and oils such as soybean oil, sunflower oil, canola oil, peanut oil, safflower oil, high oleic sunflower oil, high oleic safflower, palm stearine, meadowfoam and mixtures thereof. The preferred beta tending hardstock is fully hydrogenated canola oil having an IV less than 10. It is desirable that the beta tending hardstock have a low IV since unsaturates in the hardstock contribute to the total amount of trans in the plastic shortening.

Hardstock component (ii) is a beta prime tending hardstock preferably having an IV of less than about 10, preferably less than about 8. Preferably the beta prime tending hardstock is a fully hydrogenated triglyceride having key long chain substituents arranged in combinations of $C_n, C_{(n-4)}C_n$, or $C_{n(n-4)}, C_n, C_n$ where "n" is from about 18 to about 26. A suitable hardstock component can be derived from marine oil, crambe oil, high erucic acid rapeseed oil and mixtures thereof. The preferred beta prime tending hardstock is high erucic acid rapeseed oil having an IV less than 10. This material tends to crystallize in the beta prime phase and is known to hinder the formation of beta phase crystals in conventional plastic shortenings. It has been found that high erucic acid rapeseed oil and the other hardstocks meeting the requirements set forth herein for hardstock component (ii) when used in the specified proportions with the beta tending hardstock component (i) result in a stable beta phase.

The plastic shortenings of this invention are predominantly beta in crystal structure yet are not of soupy highly fluid consistency or translucent in appearance but rather are stable, of uniform solid consistency, more opaque in appearance, and are able to withstand wider temperature variations without affecting performance.

Antioxidant

The edible oil has a tendency to oxidize. Some oils contain a natural antioxidant and others are naturally stable to oxidation. For the naturally stable oils, it is not necessary to add an antioxidant. Preferably the base oil contains a total from about 25 to about 500 ppm, more preferably from about 50 to about 300 ppm of added antioxidant, but no more than about 500 ppm. It is important that the level of antioxidant be controlled. Some antioxidants provide increasing protection as the concentration increases. At higher levels some can act as prooxidants. A proper balance must be maintained between the quantity which provides maximum stabilization and that which participates in the chain reaction and thereby intensifies oxidation. The antioxidant allows the use of an unhydrogenated base oil in the formula.

The antioxidant tocopherol that is naturally present in the base oil at levels of about 0.01% or greater provides some oxidative stability to the plastic shortening. If the oil has been treated or processed to remove tocopherol, it can be added back at an effective level.

A wide variety of antioxidants are suitable for use, including but not limited to butylated hydroxytoluene (BHT), butylated hydroxyanisole (BHA), tertiary butylhydroquinone (TBHQ), ethylenediaminetetracetic acid (EDTA), gallate esters (i.e. propyl gallate, butyl gallate, octyl gallate, dodecyl gallate, etc.), tocopherols, citric acid, citric acid esters (i.e. isopropyl citrate, etc.), gum guaiac, nordihydroguaiaretic acid (NDGA), thiodipropionic acid, ascorbic acid, ascorbic acid esters (i.e. ascorbyl palmitate, ascorbyl oleate, ascorbyl stearate, etc.) tartaric acid, lecithin, methyl silicone, polymeric antioxidant (Anoxomer) plant (or spice and herb) extracts (i.e. rosemary, sage, oregano, thyme, marjoram, etc.) and mixtures thereof. The preferred antioxidant for use in the present invention is ascorbyl palmitate in combination with tocopherol.

Emulsifier

If desired, the product may contain small percentages of known emulsifiers such as mono- and diglycerides, distilled monoglycerides, polyglycerol esters of $C_{12}$ to $C_{22}$ fatty acids, propylene glycol mono and diesters of $C_{12}$ to $C_{22}$ fatty acids, sucrose mono- and diesters of $C_{14}$ to $C_{22}$ fatty acids. Particularly suitable emulsifiers are mono-olein, monostearin or mixtures thereof. Such emulsifiers if added should be from about 1% to about 8% of the total shortening. Preferably, said emulsifier comprises a minimum of about 35% monoglycerides. Such emulsifiers can be effective at modifying certain properties of the low saturate, low trans shortening. The emulsifier influences the shortening's baking performance.

Additional Ingredients

From about 0.05% to about 3% of other ingredients such as flavoring and coloring can also be added to the shortening of this invention. These include butter flavors, meat or tallow flavors, olive oil flavors and other natural or synthetic flavors. Vitamins can also be included in the oil. Various other additives can be used in the shortening of the invention provided that they are edible and aesthetically desirable. It should be recognized, however, that the presence of other additives may have an adverse effect upon the stabilizing properties of the shortening of this invention and, therefore, the desirability of the use of other additives will depend upon the overall shortening qualities desired.

Method of Preparation

There is no special apparatus or processing equipment needed. Conventional equipment may be used to process low-saturate, low trans beta plastic shortening. However, using conventional conditions will result in a shortening that is firmer and difficult to blend. Such shortenings are generally not preferred by the consumer but may be suitable for commercial use.

In contrast to the normal process of preparing shortenings, it is critical to obtain the desired set-up rate and phase transformation in the process to prevent inert gas bubble coalescence. It is also important to provide enough work input to obtain the desired finished shortening penetration. These objectives can be achieved by increasing the amount of work input to soften the shortening (i.e., greater agitation in the picker box, high agitation from an extra scraped surface heat exchanger or other device to apply added work input) and by controlling the Picker Residence Time and/or decreasing the filling temperature to prevent nitrogen bubble coalescence.

The preferred method used to prepare the shortening described herein and to obtain the necessary beta phase crystalline structure, is to heat the mixture of the base oil, hardstock blend, antioxidant and emulsifier, if desired, to a temperature from about 120° F. (49° C.) to about 180° F. (82° C.). The temperature must be at least above the melting point of its solid components to form a melt. From about 6% to about 25%, preferably from about 12% to about 23%, most preferably from about 15% to about 20% volume of an inert gas is injected into the melt under a pressure of from about 50 to about 700 psig. The shortening melt is passed through a scraped surface heat exchanger and rapidly cooled in less than about 60 seconds and preferably in less than about 30 seconds to a temperature of from about 40° F. (4° C.) to about 70° F. (21° C.) to initiate fat crystallization therein. The cooled mixture is then agitated in a picker box to transform said shortening to at least 50% beta crystals upon filling and imparting enough work input such that said shortening mixture has a finished shortening consistency of from about 160 mm/10 to about 275 mm/10 and an inert gas bubble size less than 1 mm. This can usually be accomplished in from about 1 to about 8 minutes, preferably in about 3 to about 6 minutes.

The mixture is then heated in a scraped surface heat exchanger with variable revolutions per minute until the plastic shortening has a grease cone viscosity after 5 minutes of from about 100 to about 200 mm/10 to prevent nitrogen bubble coalescence. The grease cone viscosity is indicative of the ability of the shortening to temper to the appropriate finished shortening penetration. The finished shortening should have 180 to 275 mm/10 shortening penetration. A suitable method for determining finished shortening penetration is illustrated in the following reference, incorporated by reference herein: U.S. Pat. No. 4,996,074 to Seiden and White, (assigned to The Procter & Gamble Company), issued Feb. 26, 1991 (Tailored Beta-Prime Stable Triglyceride Hardstock).

The grease cone analysis is the same as the penetration analysis in the above-mentioned U.S. Pat. No. 4,996,074 except the precision cone 73525 was used. The cone weighs 35 grams, has a 2⅝ inch diameter and is 3⅛ inches in length. The grease cone penetration is measured about 5 minutes after filling the package. The shortening is heated to a filling temperature of from about 70° F. (21° C.) to about 95° F. (35° C.). The shortening is immediately put into suitable containers. The packaged shortening is then tempered at a constant temperature of from about 80° F. (27° C.) to about 100° F. (38° C.) for at least about 24 hours.

As previously stated, the low-saturate, low trans plastic shortening of the present invention uses conventional equipment. Said process can be varied by one skilled in the art to achieve the plastic shortening of the present invention.

Although the present invention has been described in considerable detail with reference to certain preferred versions thereof, the spirit of the scope of the appended claims should not be limited to the description of the preferred versions contained herein.

EXAMPLE 1

Low Saturate, Low Trans Beta Stable Shortening

A low saturate, low trans beta stable shortening having 2.15 grams of saturates and 0.09 grams of trans per serving and a penetration of 235 mm/10 is prepared as follows:

A 400# blend of shortening comprising 85.0 parts of refined and bleached unhydrogenated Canola Oil (with a chemical saturates level of 7.1%), 9.0 parts of a high erucic acid rapeseed hardstock (hereinafter referred to as "HEAR hardstock") with a behenic acid level of 45% hydrogenated to an iodine value less than 10, and 4.8 parts refined and bleached Canola oil hydrogenated to an iodine value of less than 10 is prepared. This blend is deodorized at 450° F. (232° C.) in a batch deodorizer unit for two hours using moderate stripping steam levels and a vacuum of less than 8 mm Hg. To the deodorized mixture, 100 ppm of a 25% citric acid solution in water at about 300° F. (149° C.) is added while cooling the vessel. The mixture is then cooled to 160° F. (71° C.) and filtered through a one micron filter. To this cooled mixture 1.2 parts of mono olein (one such acceptable supply of this material is Myverol 18–99 manufactured by Eastman Kodak), and 100 ppm of Ascorbyl Palmitate, (manufactured by Hoffman-LaRoche) is added. This blend contains 19.9% chemical saturates and 0.8% trans isomers. The blend is placed in the finishing process melt tank where it was held at about 150° F. (660° C.). The melted shortening is continuously fed into the freezing process through a high pressure pump. Nitrogen at a level of from about 19%–20% by volume is injected prior to the pump and prior to entering the freezer. The pressure in the freezer is maintained above 300 psig. The shortening is then fed at a rate of 400 pounds per hour through two brine cooled "Votator" brand 3 inch by 12 inch scraped surface heat exchangers piped in series. The brine inlet temperature is maintained below 0° F. (−17.78° C.). The shortening mixture is cooled to a freezer outlet temperature of 50° F. (10° C.). The chilled stock then flows into two picker boxes piped in series. The first picker box, manufactured by Votator (6 inch by 24 inch), operates at a shaft speed of 422 revolutions per minute (hereinafter "RPM") and contains 3 minutes of residence time. The second picker box operates at 180 RPM and provides an additional minute of residence time under agitation. The additional time is key to allow the polymorphic phase to transition to occur, and to work soften the shortening to improve its blendability and softness. Allowing the phase transition before exiting the process gives the shortening its glossy appearance and prevents inert gas bubble coalescence that may lead to a cheesy appearance. After exiting the picker boxes, the shortening is heated to a filling temperature of 80° F. (27° C.) through a Votator scraped surface heat exchanger using warm water at 120° F. (49° C.). The shortening is passed through a slotted valve with a 0.040 inch (0.102 cm) clearance where the pressure is lowered from 360 psig to atmospheric pressure and filled into a can. The set up rate of the shortening is quick enough to prevent nitrogen bubble coalescence and the grease cone penetration was 117 five minutes after filling. The shortening is then allowed to temper in an 85° F. (29° C.) constant temperature room for 48 hours. After returning the shortening to 70° F. (21° C.) for two days, the appearance of the shortening and the penetration is measured. The appearance is smooth and creamy. The bubble is less than 1 mm.

EXAMPLE 2

This example demonstrates how a low saturate low trans beta stable shortening may be prepared using a conventional shortening processing method.

A 400# blend of shortening comprising 82.2 parts of refined and bleached unhydrogenated Canola Oil (with a chemical saturates level of 7.1%), 9.0 parts of a high erucic acid rapeseed hardstock (referred to as HEAR hardstock) with a behenic acid level of 45% hydrogenated to an iodine value less than 10, and 4.8 parts refined and bleached Canola oil hydrogenated to an iodine value of less than 10 is prepared. This blend is deodorized at 450° F. (232° C.) in a batch deodorizer unit for two hours using moderate stripping steam levels and a vacuum of less than 8 mm Hg. To the deodorized mixture, 100 ppm of a 25% citric acid solution in water at about 300° F. (149° C.) is added while cooling the vessel. The mixture is then cooled to 160° F. (71° C.) and filtered through a one micron filter. To this cooled mixture is added 4.0 parts of monoolein (one such acceptable supply of this material is Myverol 18–99 manufactured by Eastman Kodak), and 100 ppm of Ascorbyl Palmitate, (manufactured by Hoffman-LaRoche) is added. This blend contains 19.9% chemical saturates and 0.8% trans isomers. The blend is placed in the finishing process melt tank where it is held at about 150° F. (66° C.). The melted shortening is continuously fed into the freezing process through a high pressure pump. Nitrogen at a level of from about 19%–20% by volume is injected prior to the pump and prior to entering the freezer. The pressure in the freezer is maintained above 300 psig. The shortening is then fed at a rate of 400 pounds per hour through two brine cooled "Votator" brand 3 inch by 12 inch scraped surface heat exchangers piped in series. The brine inlet temperature is maintained below 0° F. (−17.78° C.). The shortening mixture is cooled to a freezer outlet temperature of 50° F. (10° C.). The chilled stock then flowed into two picker boxes piped in series. The picker box, manufactured by Votator (6 inch by 24 inch), operates at a shaft speed of 422 revolutions per minute (hereinafter "RPM") and contains 3 minutes of residence time. After exiting the picker box, the shortening is heated to a filling temperature of 80° F. (27° C.) through a Votator scraped surface heat exchanger using warm water at 120° F. (49° C.). The shortening is passed through a slotted valve with a 0.040 inch (0.102 cm) clearance where the pressure is lowered from 360 psig to atmospheric pressure and filled into a can. The shortening is then allowed to temper in an 85° F. (29° C.) constant temperature room for 48 hours. After returning the shortening to 70° F. (21° C.) for two days, the appearance of the shortening and the penetration is measured. The appearance is smooth and creamy with no cheesy appearance and the finished shortening penetration is about 180 mm/10. The bubble size is less than 1 mm. The resulting shortening is a chemical saturates level of 2.14 grams per serving and 0.09 grams of trans isomers per serving.

EXAMPLE 3

This example demonstrates how picker residence time can effect finished shortening penetration.

A low saturate low trans beta stable shortening was prepared according to Example 1 except the residence time in the first picker box is 3 minutes and residence time in the second picker box is about 9 minutes. The resulting shortening had a swiss cheese appearance and a finished shortening penetration of 288 mm/10. The chemical saturates level was 2.15 grams and the trans isomer content was 0.09 grams per serving.

What is claimed is:

1. A process for making a low saturate, low trans beta stable plastic shortening comprising the steps of:
   1) fully melting and mixing at a temperature from about 120° F. (49° C.) to about 180° F. (82° C.) a mixture comprising:
      a) an edible oil having less than 8% by weight of saturated fatty acids, and from 0% to about 10% by weight, of edible trans fatty acids, wherein said edible oil comprises from about 74% to about 90% by weight of said plastic shortening;
      b) a hardstock blend having a beta stable crystalline phase consisting essentially of i) from about 25% to about 80% by weight, of a beta phase tending hardstock component having an iodine value of less than 10, and ii) from about 20% to about 75% by weight of a beta prime phase tending hardstock component, crystallized in beta form, having an iodine value of less than about 10, said hardstock blend comprising from about 10% to about 20% by weight of said plastic shortening;
      c) from 0 to about 500 per million by weight of an antioxidant, and
      d) an effective amount of an emulsifier;
   2) injecting from about 12% to about 23% of an inert gas, under a pressure of from about 50 to about 700 pounds per square inch to form a shortening mixture;
   3) rapidly cooling said shortening mixture in a scraped wall heat exchanger in less that about 60 seconds to a temperature of from about 40° F. (4.4° C.) to about 70° F. (21.1° C.) while maintaining a pressure of from about 50 to about 700 psig;
   4) agitating said shortening mixture and imparting enough work input in a picker box for from about 1 to about 8 minutes to transform said shortening mixture to at least 50% beta crystals upon filling, said shortening mixture having a finished shortening consistency of from about 160 mm/10 to about 275 mm/10 and a maximum inert gas bubble size less than 1 mm;
   5) heating said shortening to a temperature from about 70° F. (21° C.) maximum to 95° F. (35° C.) and passing said shortening through a slotted valve no more than 0.060 inch in width while lowering the pressure from 300 psig to about 700 psig to atmospheric pressure to form a fine inert gas bubble dispersion; said shortening mixture having a filling temperature of from about 40° F. (4° C.) to about 95° F. (35° C.);
   6) tempering said shortening at a temperature of from about 80° F. (27° C.) to about 110° F. (43° C.) for at least about 24 hours.

2. A shortening process according to claim 1 having a maximum gas bubble size less than 1 mm and a finish penetration from about 180 mm/10 to about 275 mm/10.

3. A shortening process according to claim 2 wherein said inert gas is from about 12% to about 23% by volume and is selected from a group consisting of nitrogen, argon, helium and mixtures thereof.

4. A shortening process according to claim 3 wherein said beta phase tending hardstock is fully hydrogenated triglyceride comprising from about 85% by weight to about 100% by weight fatty acid groups having 16 to 22 carbon atoms.

5. A shortening process according to claim 3 wherein the antioxidant is from 55 ppm to 500 ppm.

6. A shortening process according to claim 5 wherein the antioxidant is ascorbyl palmitate.

7. A shortening process according to claim 5 wherein said antioxidant is selected from a group consisting of butylated hydroxytoluene, butylated hydroxyanisole, rosemary extract, tocopherols, citric acid, methyl silicone, ascorbic acid esters, ascorbic acid, ethylenediaminetetraacetic acid, tert-butyhydroquinone, ascorbyl palmitate, propyl gallate, citric acid esters or mixtures thereof.

8. A shortening process according to claim 7 wherein the antioxidant is ascorbyl palmitate.

9. A shortening process according to claim 2 wherein said beta phase tending hardstock is fully hydrogenated triglyceride comprising from about 85% by weight to about 100% by weight fatty acid groups having 16 to 22 carbon atoms.

10. A shortening process according to claim 2 wherein said emulsifier is from 1% to 8%.

11. A shortening process according to claim 10 wherein said base oil is selected from the group consisting of vegetable, animal or marine oils, hydrogenated vegetable, animal or marine oils, modified vegetable oil, modified animal or marine oils, microbial oils, synthetic oils, low calorie oils, fractionated oils or mixtures thereof.

12. A shortening process according to claim 11 wherein said base oil is selected from the group consisting of sunflower oil, soybean oil, olive oil, corn oil, canola oil, peanut oil, safflower oil, high oleic safflower oil, sunflower oil, high oleic sunflower oil and mixtures thereof.

13. A shortening process according to claim 12 wherein said base oil is selected from the group consisting of high oleic sunflower oil, refined and bleached canola oil, and mixtures thereof.

14. A shortening process according to claim 10 wherein said beta phase tending hardstock is fully hydrogenated triglyceride comprising from about 85% by weight to about 100% by weight fatty acid groups having 16 to 22 carbon atoms.

15. A shortening process according to claim 14 wherein said beta phase-tending hardstock is selected from the group consisting of soybean oil, sunflower oil, canola oil, olive oil, corn oil, canola oil, peanut oil, safflower oil, high oleic sunflower oil, high oleic safflower, meadowfoam oil, palm stearine, cottonseed and mixtures thereof.

16. A shortening process according to claim 15 wherein said beta prime phase tending hardstock is an oil derived from a member selected from the group consisting of marine oil, crambe oil, high erucic acid rapeseed oil and mixtures thereof.

17. A shortening process according to claim 10, wherein the said emulsifier is from about 1% to 6% of the composition, said emulsifier is selected from a group consisting of superglycerinated fat, distilled monoglycerides or mixtures thereof, said emulsifier having from about 25% by weight to about 95% by weight monoglyceride.

18. A shortening process according to claim 17 wherein the emulsifier is selected from commercial grade monoolein, monostearin or mixtures thereof.

* * * * *